United States Patent
Ette et al.

(10) Patent No.: US 6,522,937 B2
(45) Date of Patent: *Feb. 18, 2003

(54) HAND-HELD DEVICE FOR A PROGRAMMABLE CONTROL UNIT

(75) Inventors: Bernd Ette, Mönchwinkel (DE); Paul Fröhlich, Sulzbach-Rosenberg (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,972

(22) PCT Filed: Mar. 18, 1997

(86) PCT No.: PCT/DE97/00617

§ 371 (c)(1),
(2), (4) Date: Apr. 26, 1999

(87) PCT Pub. No.: WO97/35239

PCT Pub. Date: Sep. 25, 1997

(65) Prior Publication Data

US 2002/0183871 A1 Dec. 5, 2002

(30) Foreign Application Priority Data

Mar. 19, 1996 (DE) .......................... 196 13 027

(51) Int. Cl.[7] .............................................. G05B 15/00

(52) U.S. Cl. ............................ 700/87; 700/17; 700/18; 700/65; 700/66; 700/170; 700/180; 701/51; 701/52; 984/388; 984/389; 984/90

(58) Field of Search .............................. 700/15, 17–18, 700/19, 65, 83, 84, 85, 87, 88, 180–181, 170; 984/388, 389, 390; 701/51, 52

(56) References Cited

U.S. PATENT DOCUMENTS

| | | | |
|---|---|---|---|
| 4,272,816 A | | 6/1981 | Matsumoto .................. 364/483 |
| 4,403,303 A | * | 9/1983 | Howes et al. .................. 703/27 |
| 4,484,506 A | * | 11/1984 | Sato ............................. 84/454 |
| 4,559,599 A | * | 12/1985 | Habu et al. .................. 340/439 |
| 4,751,605 A | | 6/1988 | Mertz et al. .................. 361/91 |
| 4,767,968 A | * | 8/1988 | Geanous et al. ............ 315/131 |
| 5,010,285 A | * | 4/1991 | Kawamura et al. ......... 318/567 |
| 5,057,755 A | * | 10/1991 | Naka .......................... 318/562 |
| 5,136,222 A | * | 8/1992 | Yamamoto et al. ......... 318/111 |

(List continued on next page.)

FOREIGN PATENT DOCUMENTS

| | | |
|---|---|---|
| DE | 38 32 123 | 4/1989 |
| DE | 42 36 247 | 4/1994 |
| DE | 295 01 535 | 5/1995 |
| DE | 44 14 009 | 9/1995 |
| EP | 0 136 579 | 4/1985 |
| EP | 0 549 541 | 6/1993 |
| FR | 2 687 807 | 8/1993 |
| WO | 86/05945 | 10/1986 |

OTHER PUBLICATIONS

M. Becker et al., "Programmiergerät PG 170–leicht, und voll industrietauglich", Heft 2, 1991.

*Primary Examiner*—Ramesh Patel
(74) *Attorney, Agent, or Firm*—Kenyon & Kenyon

(57) ABSTRACT

Operating values of an electronic operating system, e.g., power switch or motor drive, are parameterized with a hand-held control device with a display device for displaying operating parameters via transmission arrangement, to a data store of the hand-held control device following connection of the latter to the operating system (2). A microprocessor circuit (25) in the hand-held control device facilitates the detection of altered operating parameters and the transfer of those altered parameters back to the control unit of the operating system.

15 Claims, 2 Drawing Sheets

U.S. PATENT DOCUMENTS

| | | | | |
|---|---|---|---|---|
| 5,163,171 A | * | 11/1992 | Seki et al. | 318/570 |
| 5,187,655 A | | 2/1993 | Post et al. | 364/146 |
| 5,241,659 A | * | 8/1993 | Parulski et al. | 345/589 |
| 5,249,138 A | * | 9/1993 | Piety et al. | 340/679 |
| 5,392,207 A | * | 2/1995 | Wilson et al. | 318/568.1 |
| 5,457,370 A | * | 10/1995 | Edwards | 318/571 |
| 5,543,925 A | * | 8/1996 | Timmermans | 358/451 |
| 5,781,652 A | * | 7/1998 | Pratt | 33/512 |
| 5,801,946 A | * | 9/1998 | Nissen et al. | 434/308 |

\* cited by examiner

HAND-HELD DEVICE FOR A PROGRAMMABLE CONTROL UNIT

FIELD OF THE INVENTION

The present invention relates to a hand-held device for connection to a control unit designed as a tripping device of an electronic device such as a circuit breaker or motor drive. The control unit has a programmable memory circuit for storing performance characteristics. The hand-held device also has a display device for display of performance characteristics transmitted to the hand-held device from the control unit by a transmission arrangement and is provided with a microprocessor circuit and an electronic data storage to store the performance characteristics transmitted from the control unit.

BACKGROUND INFORMATION

A conventional hand-held device is described in U.S. Pat. No. 4,751,605. In conjunction with circuit breakers, a transmission of data from the control units to the hand-held terminal is provided to simplify the electronic overcurrent trip units of the circuit breakers by providing only one hand-held terminal for displaying the set parameters of multiple circuit breakers. There are no provisions for transmitting data in the opposite direction.

Furthermore, U.S. Pat. No. 4,272,816 describes a setting aid for the tripping curve of a switching device of a circuit breaker. The setting aid has the form of a matrix arrangement of plug-in orifices for programming pins. This limits the function of the setting aid to setting a tripping characteristic curve of a microcomputer of the protective device.

An object of the present invention is to provide a hand-held terminal with expanded functions, so that it can be used not only for circuit breakers but also for other devices, such as motor control units, that are equipped with programmable electronic trip units.

SUMMARY OF THE INVENTION

According to the present invention, this object is achieved by the fact that the hand-held terminal has a keypad for creating altered performance characteristics and for storing these altered performance characteristics in the electronic data memory, and the altered performance characteristics can be transmitted back out of the electronic data memory to the control unit of the electric device over the transmission means.

By using a hand-held terminal according to the present invention, when connected to the respective device, such as a circuit breaker or a motor control unit, the user is provided with a display showing which operating parameters and optionally which status values and diagnostic values are currently stored or programmed in the control unit. These parameters are entered into the electronic data memory of the hand-held terminal, where they are then available for processing. The parameters can be altered either with the existing connection to the control unit of the device or after being separated from the device. Due to the fact that the performance characteristics are stored in the hand-held terminal, it is possible in particular to set the trip units of multiple devices, e.g., multiple circuit breakers in a low-voltage switching station, at the same performance characteristics.

The application range of the hand-held terminal can be further expanded in an advantageous manner by also providing a variable program memory for storing an application program adapted to the performance characteristics to be processed. It is possible in this way to load the hand-held terminal with an application program adapted to different circuit breakers or motor control units so that the presentation, retrieval and modification of the performance characteristics can be processed in a well-defined manner.

To facilitate use of the various above-mentioned application programs for the hand-held terminal, an internal operating system for the microprocessor circuit may be provided with a test routine for the presence of an application program installed in the memory circuit of the control unit for the purpose of transfer to the program memory. This test routine can take place automatically as soon as the hand-held terminal has been connected to the respective device and activated.

Accordingly, a method of parameterization of performance characteristics of an electric device using a hand-held terminal described above, where the device has an electronic control unit with a memory circuit for the performance characteristics, may perform the following process steps:

connecting the hand-held terminal to the device, reading out and displaying on the display device the performance characteristics stored in the memory circuit of the control unit, storing the data corresponding to the performance characteristics thus read out under a selectable address in the data memory of the hand-held terminal, altering at least one performance characteristic by entering at least one command on the hand-held terminal, transmitting the altered performance characteristic to the control unit and acknowledgment of the completed transmission to the hand-held terminal, and disconnecting the hand-held terminal from the device.

A modified method according to the present invention likewise serves to parameterize performance characteristics of an electric device using a hand-held terminal which also contains a variable program memory for storing an application program adapted to the performance characteristics to be processed.

The following process steps are provided:

connecting the hand-held terminal to the device, reading out and displaying on the display device the performance characteristics stored in the memory circuit of the control unit, storing the data corresponding to the performance characteristics thus read out under a selectable address in the data memory of the hand-held terminal, disconnecting the hand-held terminal from the device, altering the performance characteristics, optionally using the application program transmitted previously, and reconnecting the hand-held terminal to the same device or an identical device and transmitting the altered performance characteristics to the electronic control unit of the device.

DETAILED DESCRIPTION

Figure 1:
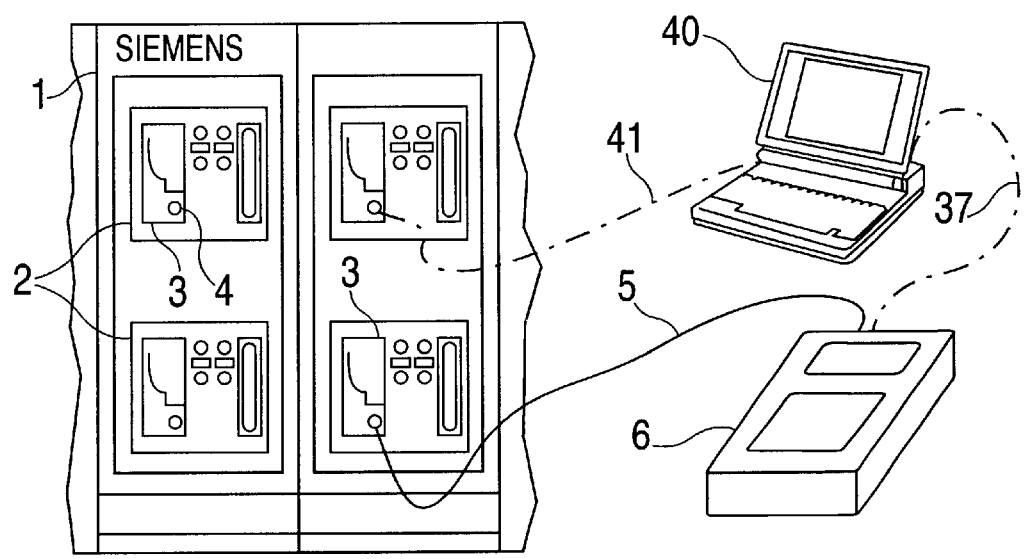
FIG. 1 shows a schematic diagram of part of the low-voltage switching station with four circuit breakers and with one hand-held terminal.

FIG. 1 shows two panels of a low-voltage switching station 1, each having two low-voltage circuit breakers 2 arranged one above the other. Each of the low-voltage circuit breakers 2 has an electronic control unit 3 in the form of an electronic trip unit. Control unit 3 contains a memory circuit for storing the performance characteristics of each circuit breaker 2 in a known way. These include in particular the rated current and tripping characteristics which depend on it, as well as a tripping characteristic curve based on the rated current. For the purposes of data transmission, each control unit 2 is provided with a bidirectional connection jack 4 which can be connected to a hand-held terminal 6 by a connecting line 5.

Figure 2:
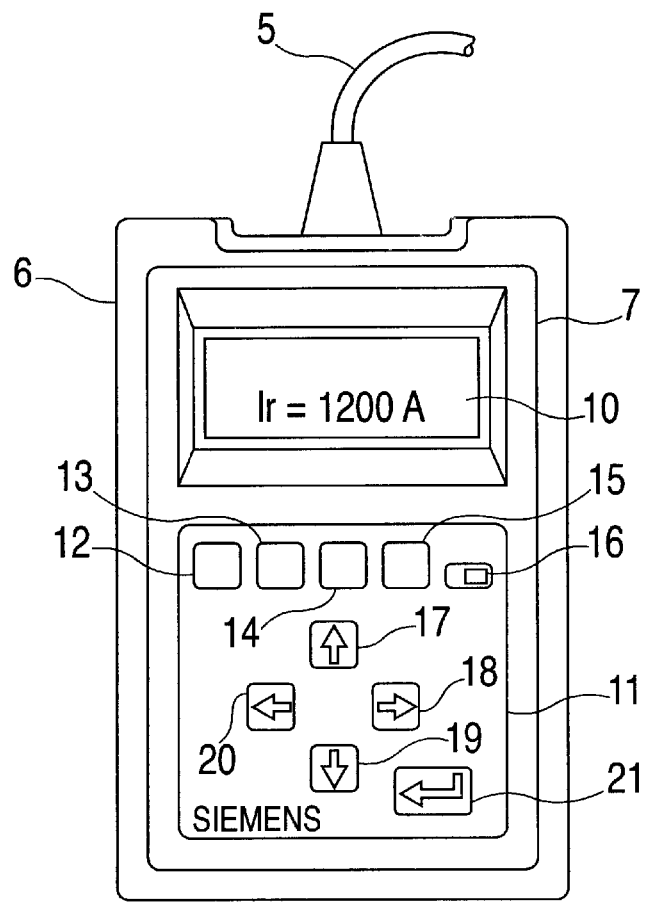
FIG. 2 shows an enlarged diagram of the hand-held terminal illustrated in FIG. 1.

Details of hand-held terminal 6 are described below with reference to FIG. 2. Hand-held terminal 6 has generous dimensions suitable for use based on other hand-held terminals. As shown in FIG. 2, hand-held terminal 6 includes a housing 50. A display device 10, which may be a two-line LCD display, for example, is provided on a front control panel 7 at the top. Below display device 10 there is a keypad 11 on control panel 7 having a top row of function keys 12, 13, 14 and 15 and a switch 16 for turning hand-held terminal 6 on and off. Below this row of function keys there are direction keys 17, 18, 19 and 20 which have arrows and an input key 21. Connecting line 5 shown in FIG. 1 comes into the top end face of hand-held terminal 6.

Figure 3:
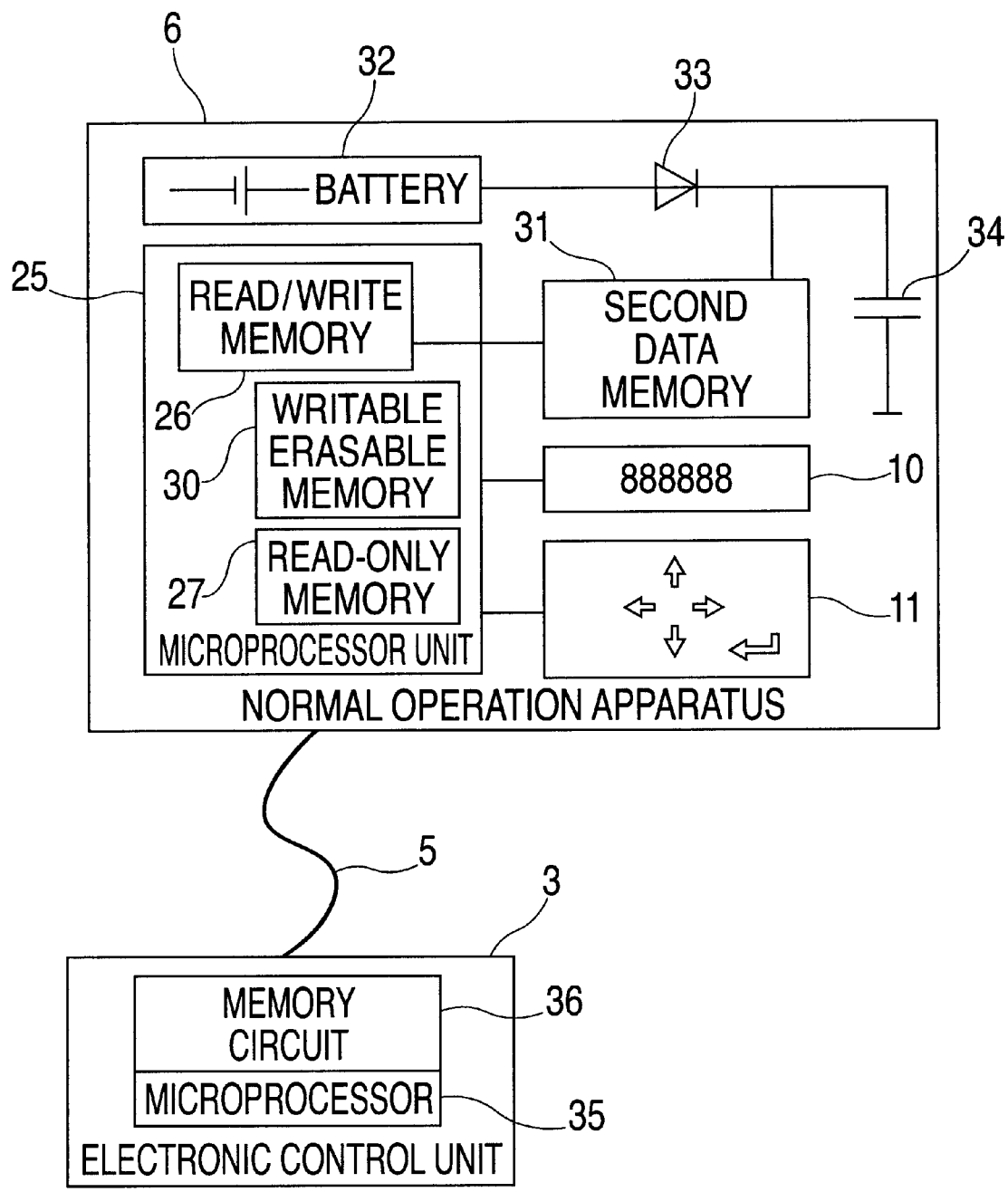
FIG. 3 shows a block diagram of the hand-held terminal illustrated in FIG. 2.

Before discussing the details of operation, the design of hand-held terminal 6 shall be explained with reference to the block diagram shown in FIG. 3. A microprocessor unit 25 with a read/write memory 26, a read-only 27 and a writable and erasable program memory 30. Furthermore, hand-held terminal 6 has a second data memory 31 and above-described display device 10 plus keypad 11, shown in simplified form. Furthermore, hand-held terminal 6 is provided with a power supply device including a battery 32 and a high-capacity storage capacitor 34 that can be charged via a diode 33. Additional data memory 31 is thus buffered even when power is withdrawn from battery 32. Hand-held terminal 6 is connected by above-mentioned connecting line 5 to control unit 3, where a microprocessor 35 and a memory circuit 36 are indicated.

After connecting hand-held terminal 6 to a circuit breaker 2 as shown in FIG. 1 and turning on hand-held terminal 6 using switch 16, the user can first select a desired menu by operating arrow keys 17, 18, 19 and 20. If the device is a circuit breaker, as shown in FIG. 1, a menu for the protective functions of circuit breaker 2 may be provided. In addition to displaying for the user numerical values for performance characteristics, e.g., a 1200 A tripping current according to FIG. 2, display device 10 may indicate which mode hand-held terminal 6 is in and how the displayed values can be altered. An altered value is confirmed by operating input key 21 after the set value has been incremented or decremented by using arrow keys 18 and 20. Above-mentioned function keys 12, 13, 14 and 15 may optionally be allocated to group functions. One of the function keys may also be wired as a reset key (RESET).

The data to be processed is not only stored in read-write memory 26 of microprocessor unit 25 but is also available in additional data memory 31, where it remains if the connection between circuit breaker and hand-held terminal 6 is broken. In this way, a data record transmitted by control unit 2 can be processed in hand-held terminal 6, i.e., the various performance characteristics can be altered and stored in altered form. Then, hand-held terminal 6 can be connected to the same circuit breaker 2 or another circuit breaker 2 as illustrated to transmit the altered performance characteristics to control units 3. The operating mode described above makes it easier to make adjustments that are necessary for operating reasons in large-scale switching stations or equipment plants.

In addition, it is shown in FIG. 1 that hand-held terminal 6 can be connected to a portable compact computer 40 by a connecting line 37. Since the computer has a high quality display screen, not only can individual performance characteristics be displayed in this way, but in addition, all performance characteristics transmitted from control unit 3 to hand-held terminal 6 plus optional status values or diagnostic values can also be displayed in an easy-to-read form, such as tables. It is likewise possible for the performance characteristics to be processed by compact computer 40 by using a modified application program, and there is the possibility of displaying characteristics graphically because of the larger display screen. Then the altered set of performance characteristics can be transmitted back to hand-held terminal 6 over connecting line 37. Although, as indicated in FIG. 1, it is possible to connect compact computer 40 directly to one control unit 3 of a circuit breaker 2 using a connecting line 41, it is advisable for the processing of performance characteristics described above to be performed outside the switching station by connecting hand-held terminal 6 and compact computer 40 in one office, for example.

What is claimed is:

1. A hand-held terminal for connecting to a control unit provided in an electronic device, the control unit being designed as a trip unit and including a programmable memory circuit for storing performance characteristics, the hand-held terminal comprising:
    a hand-held sized housing;
    a display device arranged in the housing and configured to display the performance characteristics received from the control unit via a transmission arrangement;
    an electronic data memory arranged in the housing, the electronic data memory;
    a microprocessor circuit arranged in the housing and configured to store the performance characteristics in the electronic data memory; and
    a keypad arranged in the housing and configured to alter the performance characteristics and to store the altered performance characteristics in the electronic data memory, the microprocessor circuit transmitting the altered performance characteristics from the electronic data memory to the control unit via the transmission arrangement.

2. The hand-held terminal according to claim 1, further comprising:
    a variable program memory arranged in the housing and configured to store an application program, the application program adapted for processing the performance characteristics.

3. The hand-held terminal according to claim 2,
    wherein the microprocessor circuit runs an operating system which has a test routine, the test routine determining a presence of the application program in the programmable memory circuit of the control unit, and
    wherein the application program is transmitted to the variable program memory as a function of the determination by the test program.

4. The hand-held terminal according to claim 1, wherein the electronic device includes one of a circuit breaker and a motor drive.

5. The hand-held terminal according to claim 1, wherein the performance characteristics stored in the electronic data memory includes at least one of a rated current, tripping characteristics and a tripping characteristic curve.

6. A method for parameterizing performance characteristics of an electronic device using a hand-held terminal, the electronic device including a control unit having an electronic memory circuit, the method comprising:

connecting the hand-held terminal to the electronic device;

retrieving by the hand-held terminal the performance characteristics stored in the electronic memory circuit of the control unit;

displaying the performance characteristics on a display device of the hand-held terminal;

storing data corresponding to the performance characteristics at an address in a data memory disposed in the hand-held terminal;

altering at least one characteristic of the performance characteristics by entering at least one command into the hand-held terminal;

transmitting the at least one altered characteristic from the hand-held terminal to the control unit;

providing an acknowledgment signal to the hand-held terminal when the transmitting step is completed; and disconnecting the hand-held terminal from the electronic device.

7. The hand-held terminal according to claim 6, wherein the connecting step includes connecting the hand-held device to an electronic trip unit.

8. The hand-held terminal according to claim 6, wherein the altering step includes altering at least one of a rated current, tripping characteristics and a tripping characteristic curve.

9. A method for parameterizing performance characteristics of an electronic device using a hand-held terminal, the electronic device including a control unit having an electronic memory circuit, the method comprising:

connecting the hand-held terminal to the electronic device;

retrieving by the hand-held terminal the performance characteristics stored in the electronic memory circuit of the control unit of the electronic device;

displaying the performance characteristics on a display device of the hand-held terminal;

storing data corresponding to the performance characteristics at an address of a data memory disposed in the hand-held terminal;

disconnecting the hand-held terminal from the electronic device;

altering the performance characteristics using an application program stored in the hand-held terminal while the hand-held terminal is disconnected from the electronic device;

reconnecting the hand-held terminal to one of: i) the electronic device, and ii) a further device, the further device being substantially identical to the electronic device and includes a control unit; and transmitting the altered performance characteristics to the control unit of the one of the electronic device and the further device.

10. The hand-held terminal according to claim 9, wherein the connecting step includes connecting the hand-held device to an electronic trip unit.

11. The hand-held terminal according to claim 9, wherein the altering step includes altering at least one of a rated current, tripping characteristics and a tripping characteristic curve.

12. A method for parameterizing performance characteristics of an electronic device using a hand-held terminal, the electronic device including a control unit having an electronic memory circuit, the method comprising:

connecting the hand-held terminal to the electronic device;

retrieving by the hand-held terminal the performance characteristics stored in the electronic memory circuit of the control unit of the electronic device;

displaying the performance characteristics on a display device of the hand-held terminal;

storing data corresponding to the performance characteristics at an address of a data memory disposed in the hand-held terminal;

disconnecting the hand-held terminal from the electronic device;

altering the performance characteristics using an application program stored in the hand-held terminal;

connecting the hand-held terminal to a further device, the further device being substantially identical to the electronic device and includes a control unit; and transmitting the altered performance characteristics to the control unit of the further device.

13. The hand-held terminal according to claim 12, wherein the connecting step includes connecting the hand-held device to an electronic trip unit.

14. The hand-held terminal according to claim 12, wherein the altering step includes altering at least one of a rated current, tripping characteristics and a tripping characteristic curve.

15. The hand-held terminal according to claim 12, wherein the altering step includes altering the at least one characteristic of the performance characteristics while the hand-held terminal is disconnected from the electronic device.

* * * * *